United States Patent
Duby et al.

(10) Patent No.: US 10,129,217 B2
(45) Date of Patent: *Nov. 13, 2018

(54) SECURE SHELL AUTHENTICATION

(71) Applicant: Dell Products, LP, Round Rock, TX (US)

(72) Inventors: Carolyn Duby, Westport, MA (US); Mark B. King, Dover, MA (US); Aric LeDell, Somerville, MA (US); Elchanan Oren, Jerusalem (IL); Michael Vincent, Providence, RI (US)

(73) Assignee: DELL SOFTWARE, INC., Aliso Viejo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/922,917

(22) Filed: Oct. 26, 2015

(65) Prior Publication Data

US 2017/0012944 A1     Jan. 12, 2017

Related U.S. Application Data

(63) Continuation of application No. 13/886,787, filed on May 3, 2013, now Pat. No. 9,172,688.

(51) Int. Cl.
    *H04L 9/32*        (2006.01)
    *H04L 29/06*     (2006.01)
    (Continued)

(52) U.S. Cl.
    CPC ............ *H04L 63/0428* (2013.01); *H04L 9/14* (2013.01); *H04L 9/30* (2013.01); *H04L 9/321* (2013.01);
    (Continued)

(58) Field of Classification Search
    CPC ..... H04L 63/08; H04L 63/0823; H04L 63/12; H04L 63/168; H04L 9/321; H04L 9/3247
    (Continued)

(56) References Cited

U.S. PATENT DOCUMENTS 7,290,288 B2    10/2007   Gregg et al.
7,987,357 B2 *    7/2011   Schneider ............... G06F 21/31
                                                    713/155
    (Continued)

OTHER PUBLICATIONS

"Microsoft Web Service Security—Scenarios, Patters, and Implementation Guidance for Web Services Enhancements (WSE) 3.0," © 2005 Microsoft Corporation.

(Continued)

*Primary Examiner* — Samson Lemma
(74) *Attorney, Agent, or Firm* — Larson Newman, LLP

(57) ABSTRACT

A first information handling system receives a security challenge and forwards it to a second information handling system. The second information handling system retrieves a private key from a public/private encryption key pair and satisfies the challenge with the private key. The second information handling system forwards the satisfied challenge without divulging the private key. The second information handling system is in a more secure environment than the first information handling system. The challenge may be satisfied by signing the challenge with the private key. Satisfying the challenge may be a step in creating a secure shell connection between the first information handling system and an organization maintaining the first information handling system and the second information handling system.

17 Claims, 5 Drawing Sheets

(51) Int. Cl.
*H04L 9/14* (2006.01)
*H04L 9/30* (2006.01)

(52) U.S. Cl.
CPC ............ *H04L 9/3247* (2013.01); *H04L 63/06* (2013.01); *H04L 63/08* (2013.01); *H04L 63/0823* (2013.01); *H04L 63/12* (2013.01); *H04L 63/168* (2013.01)

(58) Field of Classification Search
USPC ........................................................ 713/176
See application file for complete search history.

(56) References Cited

U.S. PATENT DOCUMENTS

| | | | |
|---|---|---|---|
| 8,391,495 B2* | 3/2013 | McLane | H04L 9/0844 380/277 |
| 2004/0264445 A1 | 12/2004 | Dunk | |
| 2004/0264465 A1* | 12/2004 | Dunk | H04L 12/4633 370/392 |
| 2005/0120223 A1 | 6/2005 | Kiwimagi et al. | |
| 2006/0123476 A1* | 6/2006 | Yaghmour | H04L 63/0442 726/22 |
| 2006/0271785 A1* | 11/2006 | Holtmanns | H04L 63/06 713/171 |
| 2007/0264965 A1* | 11/2007 | Taniguchi | H04W 12/02 455/403 |
| 2008/0168118 A1 | 7/2008 | Hickey et al. | |
| 2009/0138703 A1* | 5/2009 | Schneider | G06F 21/31 713/155 |
| 2009/0158392 A1 | 6/2009 | Hughes et al. | |
| 2010/0042846 A1 | 2/2010 | Trotter et al. | |
| 2011/0314533 A1 | 12/2011 | Austin et al. | |
| 2012/0266209 A1* | 10/2012 | Gooding | H04L 63/20 726/1 |
| 2013/0046994 A1* | 2/2013 | Shaw | H04L 9/3228 713/189 |
| 2013/0081112 A1* | 3/2013 | Kelly | H04L 9/3271 726/4 |
| 2013/0191627 A1* | 7/2013 | Ylonen | H04L 63/1483 713/150 |
| 2013/0191630 A1* | 7/2013 | Ylonen | H04L 63/1483 713/153 |
| 2013/0191631 A1* | 7/2013 | Ylonen | H04L 63/1483 713/153 |

OTHER PUBLICATIONS

"Oracle Access Management: Security Token Service," An Oracle White Paper, Oracle Fusion Middleware Access Management, Jul. 2012.

* cited by examiner

SECURE SHELL AUTHENTICATION

CROSS REFERENCE TO RELATED APPLICATIONS

This application is a continuation of U.S. patent application Ser. No. 13/886,787, entitled "Secure Shell Authentication," filed on May 3, 2013, the disclosure of which is hereby expressly incorporated by reference in its entirety.

FIELD OF THE DISCLOSURE

This disclosure generally relates to information handling systems, and more particularly relates to authentication of a party to a secure shell connection.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems. An information handling system may utilize measures to protect the security of data, including authenticating the parties to transactions that involve the communicating of sensitive information.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

For purposes of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory, one or more processing resources such as a central processing unit (CPU) or hardware or software control logic. Additional components of the information handling system can include one or more storage devices, one or more communications ports for communicating with external devices as well as various input and output (I/O) devices, such as a keyboard, a mouse, and a video display. The information handling system can also include one or more buses operable to transmit communications between the various hardware components.

Figure 1:
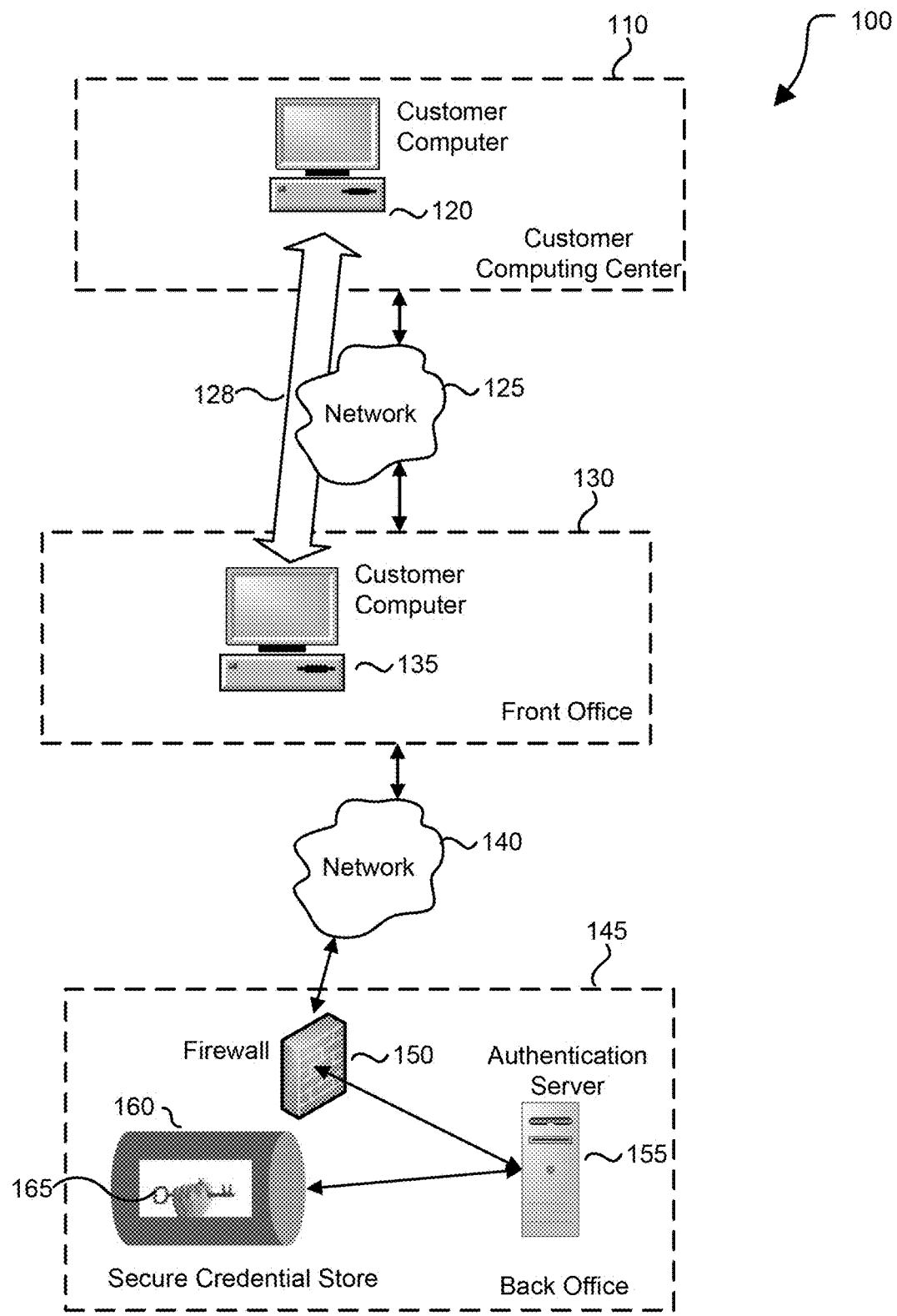
FIG. 1 is a block diagram of a system to authenticate parties to network communications according to one embodiment of the disclosure.

FIG. 1 shows a system 100 to authenticate parties to network communications that includes customer computing center 110, front office 130, and back office 145. Customer computing center 110 and front office 130 are connected by network 125, and front office 130 and back office 145 are connected by network 140. Networks 125 and 140 may consist of the Internet or a private network. In FIG. 1, customer computing center 110 includes customer computer 120 for illustration. In other embodiments, a customer computing center may include multiple information handling systems including conventional user devices and servers. The devices of the customer computing center may be positioned behind firewalls and may be connected by internal networks, which may include one or more local area networks (LANS), such as a campus LAN and a management LAN.

Front office 130 is another computer center. The organization operating front office 130, such as a business, may supply services to customer computing center 110. As with customer computing center 110, front office 130 includes worker computer 135 for illustration. In other embodiments, a front office computer center may include multiple information handling systems including conventional user devices and servers. The devices of the front office computer center may be positioned behind firewalls and may be connected by internal networks, which may include one or more local area networks (LANS), such as a campus LAN and a management LAN. The information handling systems of front office 130 may connect to a wide range of customers.

In the embodiment of FIG. 1, client computer 120 of customer computing center 110 and worker computer 135 of front office 130 establish secure shell (SSH) connection 128. The SSH protocol provides a channel for communications that features end-to-end encryption, authentication, and data integrity. Under the transportation layer of the SSH protocol, one party verifies itself to the other based upon its possession of a private/public key pair. The private key may be used to decrypt information encrypted with the public key. The holder of the key pair may disseminate the public key. Parties wishing to communicate with the holder may encrypt messages with the public key. The holder, the only entity possessing the private key, may be the only party capable of decrypting the messages. Thus, the messages to the private key holder may be secure. In turn, the holder may verify its identity by constructing a signature of a message by using the private key. When an entity possessing the public key verifies that the signature is valid, the entity knows that the sender of the message must possess the private key. In other steps of the transportation layer of the SSH protocol, the parties negotiate on a format for exchanging messages and exchange private keys that will be used to encrypt the messages.

Back office 145 includes authentication server 155 and secure credential store 160 positioned behind firewall 150. Back office 145 may be a computer center, and may contain other information handling systems in addition to those illustrated in FIG. 1. In some embodiments, the devices of a back office computer center may be connected by internal networks, which may include one or more local area networks (LANS), such as a campus LAN and a management LAN. In some embodiments, front office 130 and back office 145 may be components of the same computer center. In further embodiments, network 140 may be a LAN that also connects devices of front office 130. In many embodiments, front office 130 and back office 145 may be on different networks. In further embodiments, back office 145 may be on a segmented network separate from front office 130. The host name of authentication server 155 may be part of the segmented network specification. In some embodiments, back office 145 may be on a subnetwork of the network serving front office 130.

Authentication server 155 may perform functions as part of the authentication of a worker at front office 130. The authentication may utilize confidential information stored in secure credential store 160, which may be a data base that stores confidential information. In some embodiments, secure credential store 160 may consist of a key store, a data base that holds encryption keys, such as private/public key pairs. The key store may be an industry-standard encrypted data base file. In further embodiments, secure credential store 160 holds private/public key pair 165. In the embodiment of FIG. 1, authentication server 155 is a separate device from secure credential store 160. In other embodiments, secure credential store 160 may reside in authentication server 155.

Back office 145 may provide a more secure environment than front office 130. In some embodiments, the network connections to back office 145 may produce the added security. The security of a facility accessible by a network may depend on the nature of its network connections. The more accessible a facility, the less secure because of the increased danger of attacks from malicious parties. In particular, a business cannot implicitly trust its customers. Thus, a computing center connected to customers is inherently less secure than a purely internal computing center. In many embodiments, data in back office 145 may be protected by limiting network access to back office 145 to the devices in front office 130. Back office 145 can place more trust in the devices of front office 130 than it can the devices of at-large customers, such as customer computer 120.

Accordingly, data contained in authentication server 155 may be better protected than data contained in worker computer 135. Firewall 150 may enforce the policy of limiting back office 145's network access to connections with front office 130. In addition, the communication between back office 145 and front office 130 may be limited to certain channels and may be limited to certain front office computers. As an example, access to back office 145 may be limited to authorized computers in front office 130. In addition, in many embodiments, access to secure credential store 160 may be limited to back office computers. Front office computers may be denied direct access to secure credential store 160.

In addition, the policy governing back office 145 may provide more protection than the policy governing front office 130. In the embodiment of FIG. 1, back office 145 is protected by a firewall, while front office 130 is not protected. In other embodiments, both offices may have firewall protection, but the rules governing the back office may be stricter. In addition, rules governing access to back office 145 may be stricter than rules governing access to front office 130. In some embodiments, secure methods of communications may be used between front office 130 and back office 145. The communications may, for example, be required to utilize Transport Layer Security (TLS) or Secure Sockets Layer (SSL).

In some embodiments, access to back office 145 may be limited in other ways. Log-in procedures may be more restrictive, requiring a higher security clearance. Further, the information handling systems of back office 145 may also be kept more secure physically. They may, for example, physically separate from front office 130, such as in a separate room or rooms in the same building or in a different facility. Further, the information handling systems of back office 145 may be limited to desktop computers and servers instead of including mobile computing devices.

In other embodiments, back office 145 may be connected to the same network as front office 130. In further embodiments, the rules governing access to hosts in back office 145 may be more restrictive than those governing access to hosts in front office 130. As one example, front office 130 and back office 145 may consist of a single network with two servers, but only worker computer 135 may have Internet access.

In some embodiments, a back office may be used to protect secrets other than private keys. A secure credential store in a back office may, for example, store passwords for use by information handling systems in a front office. When needed by the front office, the passwords could be passed from the back office to the front office for forwarding to third parties. Under a security policy, the front office would promptly delete all files containing information about the passwords after their use. Thus, except for the brief periods of time that the passwords were in transit through the front office, they would remain protected in the more secure settings of the back office.

In the embodiment of FIG. 1, a worker at worker computer 135 establishes SSH connection 128 between customer computer 120 and worker computer 135. The worker may, for example, be remotely logging into customer computer 120 to configure a firewall or otherwise configure security settings. As part of establishing the connection, worker computer 135 may transmit the public key of private/public key pair 165 to customer computer 120. Customer computer 120 may, in turn, issue a challenge to worker computer 135. Satisfying the challenge may require the use of the private key of private/public key pair 165. The challenge may constitute, for example, signing a message with the private key and returning the signed message to customer computer 120. The signature would demonstrate possession of the private key and would therefore authenticate the holder of the private key.

In order to protect the private key, however, it is not made directly available to the worker at worker computer 135. Thus, once worker computer 135 receives the challenge, it may forward the challenge to authentication server 155. Authentication server 155 may access the private key of private/public key pair 165 from secure credential store 160 and may satisfy the challenge. In the example above, authentication server 155 may sign the message with the private key. Authentication server 155 may then transmit the results of satisfying the challenge to worker computer 135 of front office 130. Worker computer 135 may, in turn, transmit the results to customer computer 120. Customer computer 120 may verify satisfaction of the challenge and permit the establishment of SSH connection 128.

Other embodiments may involve different communications pathways. The SSH connection may, for example, involve another customer computer. The original customer computer may be used as a gateway to the other customer computer. Through tunneling, an SSH connection may be established between the worker computer and the other customer computer.

Embodiments of FIG. 1 may provide protection for secrets used to establish a network connection by separating the storing of the keys from the connection process. In FIG. 1, the connection process occurs between the front office and a client while the private keys are stored in the more secure back office. Thus, the connection process may be performed without divulging the private keys. To establish the connection, the authentication server made use of the private key to satisfy the security challenge, but did not need to transmit the private key to the front office or to the customer. Instead, it used the private key to sign the security challenge and transmitted the signed security challenge from the back office to the front office. In addition, embodiments of FIG. 1 may enable an SSH connection to be established without the need for any special operating system setup.

Figure 2:
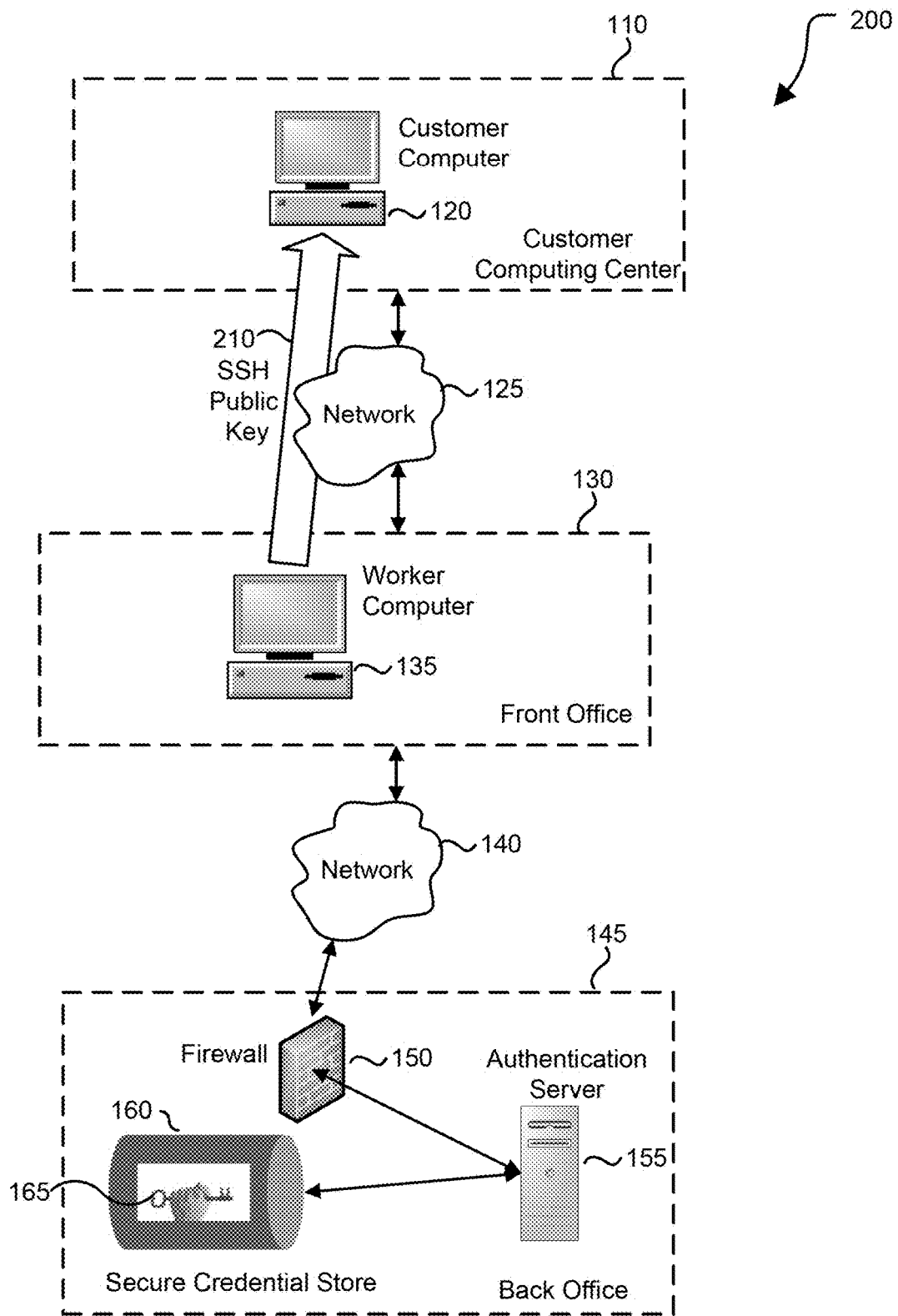
FIG. 2 is a flow diagram illustrating a method of to authenticating parties to network communications according to one embodiment of the disclosure.
Figure 2:
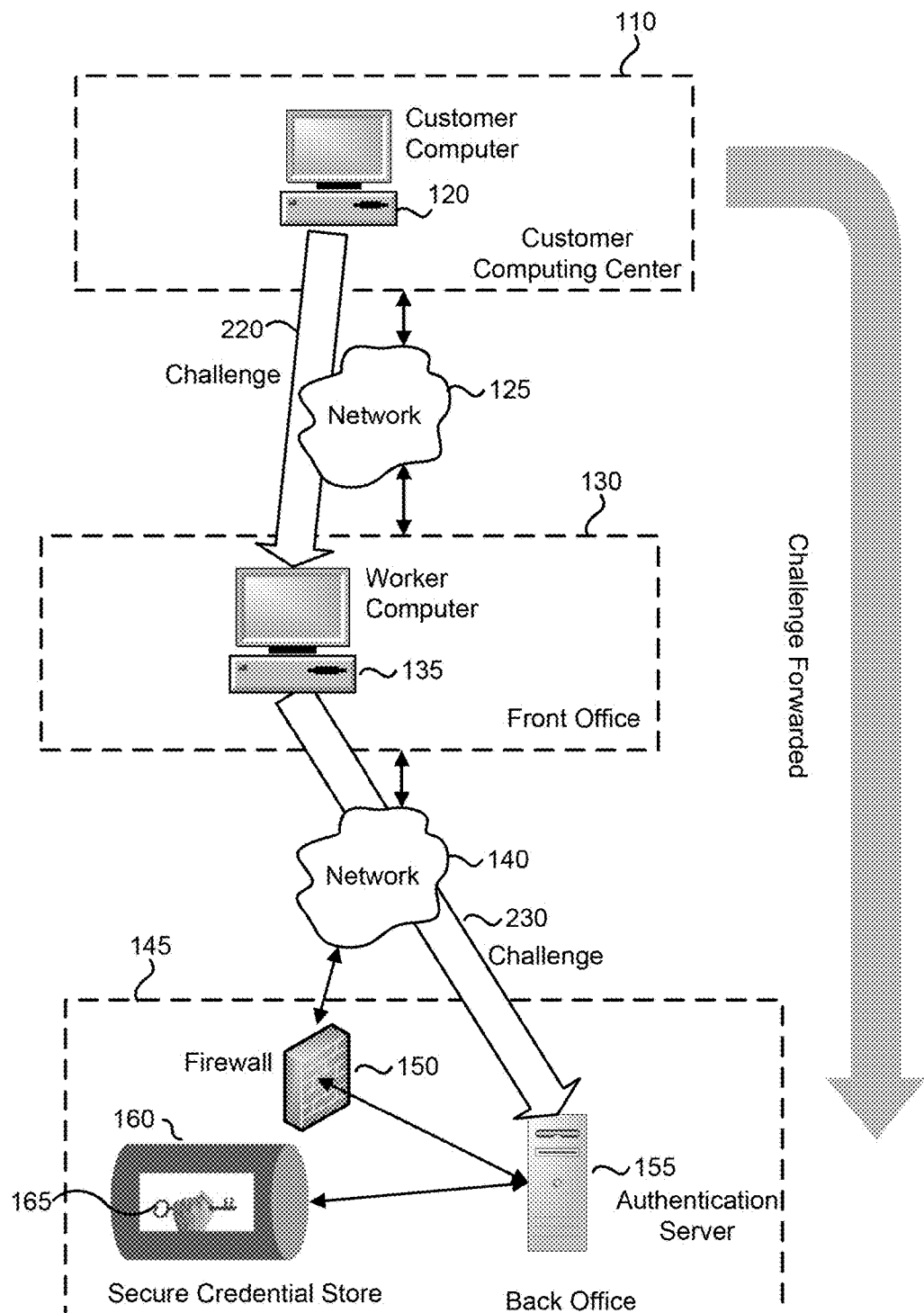
Figure 2:
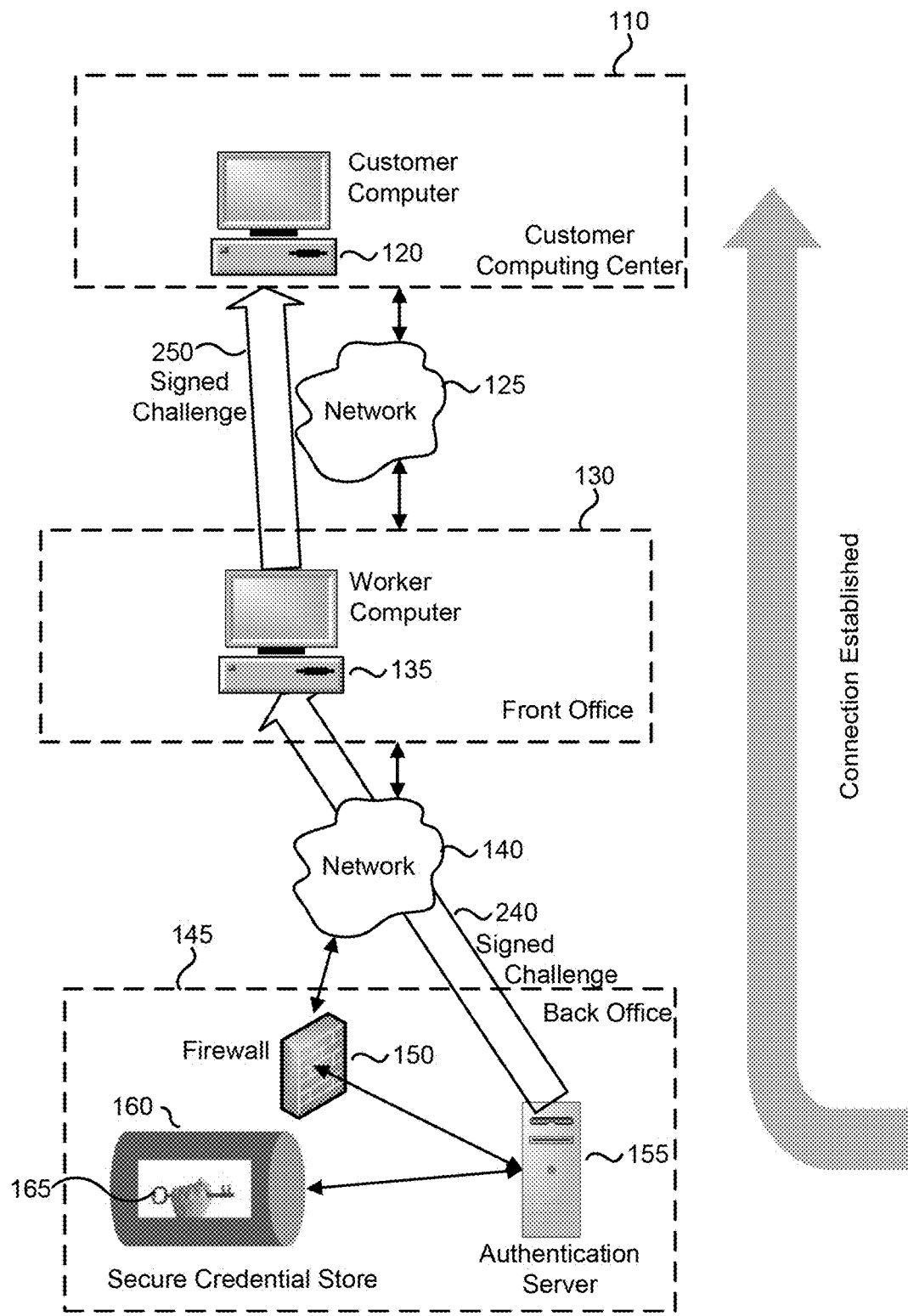

FIG. 2 is flow diagram 200 of a method of authenticating parties to network communications. In the embodiment of FIG. 2, method 200 is shown as being performed in the system of FIG. 1. In other embodiments, the method may take place in other systems. Method 200 begins at block 210 with a worker at worker computer 135 of front office 130 transmitting a public key to customer computer 120 of customer computing center 110. The public key may be part of private/public key pair 165. The transmission may be part of establishing an SSH connection between worker computer 135 and customer computer 120. One requirement to establishing an SSH protocol is that one party to the connection verify itself to the other party by showing possession of a private/public key pair. Once a party has transmitted a public key, it can demonstrate possession of the corresponding private key by constructing signatures of messages with the private key. These signatures may be verified by a holder of the public key.

At block 220, customer computer 120 sends a challenge to worker computer 135 in response to receiving the public key. Satisfying the challenge may require the use of the private key of a private/public key pair 165. At block 230, worker computer 135 forwards the challenge to authentication server 155 of back office 145. Worker computer 135 may, for example, lack access to the private key.

At block 240, authentication server 155 satisfies the challenge. Authentication server 155 may, for example, sign or otherwise encrypt a message sent from customer computer 120 with the private key of private/public key pair 165. In some embodiments, authentication server 155 may require authentication of worker computer 135 before satisfying the challenge. In many embodiments, the authentication may be derived from physical presence. Authentication server 155 may know that worker computer 135 is in the same room or a nearby location and therefore is not as vulnerable to attack as a completely unguarded computer. In other embodiments, the authentication may be based upon the connection between authentication server 155 and worker computer 135. In still other embodiments, the authentication may be established by an exchange of certificates. The certificates may, for example, be X.509 certificates, established pursuant to standards promulgated by the International Telecommunication Union.

At block 250, worker computer 135 returns the satisfied challenge, such as a message signed by the private key, to customer computer 120. As a result, an SSH connection may be established between worker computer 135 and customer computer 120.

In some embodiments, the method of FIG. 2 may provide protection for confidential information, such as a private key. By forwarding tasks requiring the use of the private key from the front office to the back office and performing the tasks in the back office, the private key is kept secure in the back office. The tasks are performed without divulging the private key to the front office. When the back office is more secure than the front office; for example, because it is less accessible, retaining the private key in the back office may provide better protection for the key.

In other embodiments, an issuer of a challenge may receive a public key from a source other than the receiver of a challenge. An organization may, for example, publicly disseminate one or more of its public keys or may disseminate them to selected recipients. The dissemination may be separate from the attempt to establish a particular connection, such as the SSH connection of FIG. 2. In other embodiments, the satisfied challenge may be transmitted to a party other than the issuer of the challenge. It may, for example, be forwarded to a party to verify that the challenge had been satisfied, or to a party that would be involved in the actual SSH communications.

Figure 3:
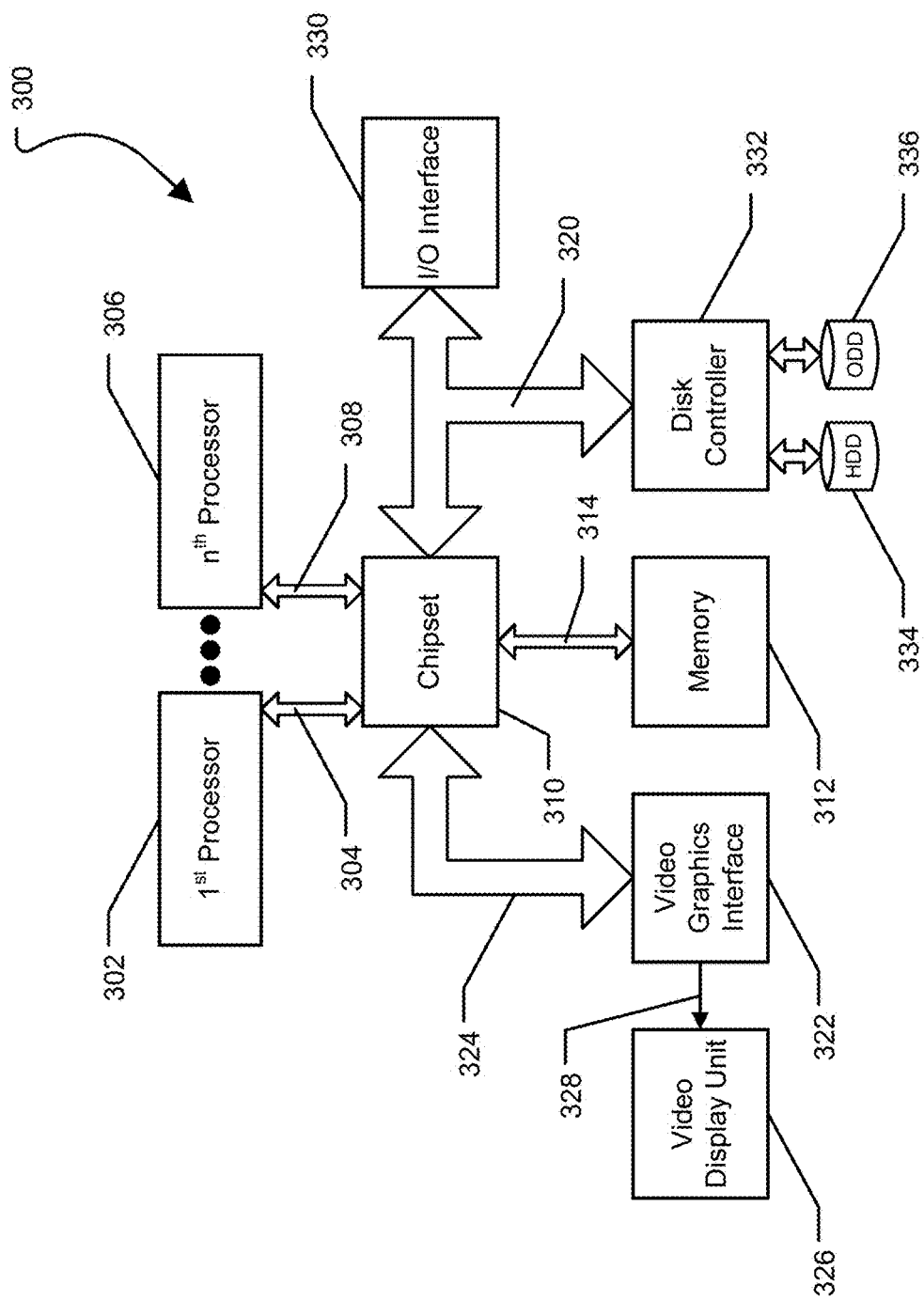
FIG. 3 illustrates a block diagram of an information handling system according to one embodiment of the disclosure.

FIG. 3 illustrates a block diagram of an exemplary embodiment of an information handling system, generally designated at 300. In one form, the information handling system 300 can include worker computer 135, customer computer 120, authentication server 155, firewall 150, or secure credential store 160 of FIG. 1, or can carry out portions of the methods of FIG. 2. The information handling system 300 can include a first physical processor 302 coupled to a first host bus 304 and can further include additional processors generally designated as $n^{th}$ physical processor 306 coupled to a second host bus 308. The first physical processor 302 can be coupled to a chipset 310 via the first host bus 304. Further, the $n^{th}$ physical processor 306 can be coupled to the chipset 310 via the second host bus 308. The chipset 310 can support multiple processors and can allow for simultaneous processing of multiple processors and support the exchange of information within information handling system 300 during multiple processing operations.

According to one aspect, the chipset 310 can be referred to as a memory hub or a memory controller. For example, the chipset 310 can include an Accelerated Hub Architecture (AHA) that uses a dedicated bus to transfer data between first physical processor 302 and the $n^{th}$ physical processor 306. For example, the chipset 310, including an AHA enabled-chipset, can include a memory controller hub and an input/output (I/O) controller hub. As a memory controller hub, the chipset 310 can function to provide access to first physical processor 302 using first bus 304 and n$^{th}$ physical processor 306 using the second host bus 308. The chipset 310 can also provide a memory interface for accessing memory 312 using a memory bus 314. In a particular embodiment, the buses 304, 308, and 314 can be individual buses or part of the same bus. The chipset 310 can also provide bus control and can handle transfers between the buses 304, 308, and 314.

According to another aspect, the chipset 310 can be generally considered an application specific chipset that provides connectivity to various buses, and integrates other system functions. For example, the chipset 310 can be provided using an Intel® Hub Architecture (IHA) chipset that can also include two parts, a Graphics and AGP Memory Controller Hub (GMCH) and an I/O Controller Hub (ICH). For example, an Intel 820E, an 815E chipset, or any combination thereof, available from the Intel Corporation of Santa Clara, Calif., can provide at least a portion of the chipset 310. The chipset 310 can also be packaged as an application specific integrated circuit (ASIC).

The information handling system 300 can also include a video graphics interface 322 that can be coupled to the chipset 310 using a third host bus 324. In one form, the video graphics interface 322 can be a Peripheral Component Interconnect (PCI) Express interface to display content within a video display unit 326. Other graphics interfaces may also be used. The video graphics interface 322 can provide a video display output 328 to the video display unit 326. The video display unit 326 can include one or more types of video displays such as a flat panel display (FPD) or other type of display device.

The information handling system 300 can also include an I/O interface 330 that can be connected via an I/O bus 320 to the chipset 310. The I/O interface 330 and I/O bus 320 can include industry standard buses or proprietary buses and respective interfaces or controllers. For example, the I/O bus 320 can also include a PCI bus or a high speed PCI-Express bus. PCI buses and PCI-Express buses can be provided to comply with industry standards for connecting and communicating between various PCI-enabled hardware devices. Other buses can also be provided in association with, or independent of, the I/O bus 320 including, but not limited to, industry standard buses or proprietary buses, such as Industry Standard Architecture (ISA), Small Computer Serial Interface (SCSI), Inter-Integrated Circuit (I$^2$C), System Packet Interface (SPI), or Universal Serial buses (USBs).

In an alternate embodiment, the chipset 310 can be a chipset employing a Northbridge/Southbridge chipset configuration (not illustrated). For example, a Northbridge portion of the chipset 310 can communicate with the first physical processor 302 and can control interaction with the memory 312, the I/O bus 320 that can be operable as a PCI bus, and activities for the video graphics interface 322. The Northbridge portion can also communicate with the first physical processor 302 using first bus 304 and the second bus 308 coupled to the n$^{th}$ physical processor 306. The chipset 310 can also include a Southbridge portion (not illustrated) of the chipset 310 and can handle I/O functions of the chipset 310. The Southbridge portion can manage the basic forms of I/O such as Universal Serial Bus (USB), serial I/O, audio outputs, Integrated Drive Electronics (IDE), and ISA I/O for the information handling system 300.

The information handling system 300 can further include a disk controller 332 coupled to the I/O bus 320, and connecting one or more internal disk drives such as a hard disk drive (HDD) 334 and an optical disk drive (ODD) 336 such as a Read/Write Compact Disk (R/W CD), a Read/Write Digital Video Disk (R/W DVD), a Read/Write mini-Digital Video Disk (R/W mini-DVD), or other type of optical disk drive.

The disk drive units 334 and 336 may include a computer-readable medium in which one or more sets of instructions such as software can be embedded. Further, the instructions may embody one or more of the methods or logic as described herein. In a particular embodiment, the instructions may reside completely, or at least partially, within memory 314 and/or within one or more of processors 302 and 306 during execution by the information handling system 300. Memory 314 and processors 302 and 306 also may include computer-readable media.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via a network interface device.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:
1. A system comprising:
 a key store to store a private/public encryption key pair and to provide the private key to an authentication server;
 the authentication server to receive requests from a first information handling system within an organization to sign messages with the private key, to retrieve the private key from the key store, to sign the messages, and to transmit the signed messages to the first information handling system without divulging the private key;

the first information handling system to transmit the signed messages to a recipient outside the organization, wherein the recipient verifies the signed message to determine the message originated with the organization, wherein the authentication server is in a more secure environment than the first information handling system and inaccessible to the recipient outside the organization, the first information handling system having network access outside the organization, and wherein the authentication server or the other information handling system includes at least one hardware processor.

2. The system of claim 1, wherein network access of the authentication server is limited to information handling systems within the organization according to a policy of the organization.

3. The system of claim 2, further comprising a firewall to implement the policy.

4. The system of claim 2, wherein:
the first information handling system has network access outside the organization; and
the authentication server is located in a facility separate from the first information handling system.

5. The system of claim 2, wherein:
the first information handling system has network access outside the organization; and
the authentication server is located in a room separate from the first information handling system.

6. The system of claim 1, wherein the authentication server is to authenticate the first information handling system as a prerequisite to signing the messages in response to the requests of the first information handling system.

7. The system of claim 1, wherein the first information handling system submits the requests to the authentication server utilizing Transport Layer Security.

8. A method comprising:
receiving at an authentication server a request to sign a message with a private key from an information handling system within an organization, the authentication server being in a more secure environment than the information handling system and inaccessible to a recipient outside of the organization, the information handling system having network access outside the organization, the authentication server and the information handling system including at least one hardware processor;

retrieving a private key from a key store, the key store configured to store a private/public encryption key pair;
signing the message with the private key; and
transmitting the signed message to the information handling system without divulging the private key, the information handling system configured to transmit the signed message to the recipient outside of the organization enabling the recipient outside the organization to verify the authenticity of the signed message using the public key to ensure the message originated with the organization.

9. The method of claim 8, further comprising authenticating the information handling system by the authentication server.

10. The method of claim 8, wherein network access of the authentication server is more restricted than network access of the information handling system according to a policy of an organization controlling the authentication server and the information handling system.

11. The method of claim 10, wherein a firewall governing network access of the authentication server implements the policy.

12. The method of claim 11, wherein:
the information handling system is on a first network;
the authentication server is on a second network;
the first network is separate from the second network; and
the second network is a segmented network.

13. The method of claim 12, wherein network access of information handling systems on the second network is limited to information handling systems on the first network.

14. The method of claim 10, wherein:
the information handling systems have network access outside the organization; and
the authentication server is located in a facility separate from the information handling systems.

15. The method of claim 10, wherein:
the information handling systems have network access outside the organization; and
the authentication server is located in a room separate from the information handling systems.

16. The method of claim 8, wherein the information handling system submits the requests to the authentication server utilizing Transport Layer Security.

17. A system comprising:
an authentication server in communication with an information handling system within an organization, the authentication server to receive requests from the information handling system to sign messages with a private key, network access of the authentication server limited to a plurality of information handling systems within the organization, the plurality of information handling systems including the information handling system; and a key store to store a private/public encryption key pair and to provide the private key to the authentication server;

the authentication server to sign the messages and to transmit the signed messages to the information handling system without divulging the private key;

the information handling system to transmit the signed messages to a recipient outside the organization, wherein the recipient outside the organization confirms that the message originated with the organization by verifying the signed message with the public key;

wherein the authentication server is in a more secure environment than the information handling system and inaccessible to the recipient outside the organization, wherein the authentication server or the information handling system includes at least one hardware processor; and wherein at least a portion of the plurality of information handling systems have network access outside the organization.

* * * * *